US010119409B2

(12) United States Patent
Charier et al.

(10) Patent No.: US 10,119,409 B2
(45) Date of Patent: Nov. 6, 2018

(54) SYSTEM FOR CHANGING THE PITCH OF THE CONTRA-ROTATING PROPELLERS OF A TURBOSHAFT ENGINE (75) Inventors: Gilles Alain Charier, La Grande Paroisse (FR); Wouter Balk, Melun (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 1441 days.

(21) Appl. No.: 14/008,394

(22) PCT Filed: Mar. 29, 2012

(86) PCT No.: PCT/FR2012/050676
§ 371 (c)(1),
(2), (4) Date: Sep. 27, 2013

(87) PCT Pub. No.: WO2012/131271
PCT Pub. Date: Oct. 4, 2012

(65) Prior Publication Data
US 2014/0017086 A1    Jan. 16, 2014

(30) Foreign Application Priority Data
Mar. 29, 2011 (FR) ..................... 11 52589

(51) Int. Cl.
*B64C 11/30* (2006.01)
*B64D 27/00* (2006.01)
(Continued)

(52) U.S. Cl.
CPC .............. *F01D 7/00* (2013.01); *B64C 11/308* (2013.01); *F04D 29/185* (2013.01);
(Continued)

(58) Field of Classification Search
CPC ........ F01D 7/00; B64C 11/306; B64C 11/308; B64D 2027/005; F05D 2220/324;
(Continued)

(56) References Cited

U.S. PATENT DOCUMENTS

| 4,657,484 | A | 4/1987 | Wakeman et al. |
| 8,172,530 | B2 * | 5/2012 | Perkinson ............... B64C 11/36 |
| | | | 416/1 |

(Continued)

FOREIGN PATENT DOCUMENTS

| EP | 2 261 114 | 12/2010 |
| FR | 949 767 | 9/1949 |

(Continued)

OTHER PUBLICATIONS

International Search Report dated Aug. 13, 2012 in PCT/FR12/050676 Filed Mar. 29, 2012.

*Primary Examiner* — Logan Kraft
*Assistant Examiner* — Christopher R Legendre
(74) *Attorney, Agent, or Firm* — Oblon, McClelland, Maier & Neustadt, L.L.P.

(57) ABSTRACT

A system, including: a linear actuator axially arranged in a first propeller and rotatably secured thereto, a first linking mechanism connecting a rod of the linear actuator to a second propeller to change a setting of blades thereof, and including an intermediate bearing between the propellers, which is capable of transmitting translation of the rod of the linear actuator and disconnecting a rotatable link to the first propeller to make it possible to change the setting of the blades of the second propeller rotated in an opposite direction to the first propeller, and a second linking mechanism combined with blades of the first propeller to change a setting thereof.

11 Claims, 5 Drawing Sheets (51) Int. Cl.
*F01D 7/00* (2006.01)
*F04D 29/18* (2006.01)
*F04D 29/32* (2006.01)
*F04D 29/36* (2006.01)

(52) U.S. Cl.
CPC ......... *F04D 29/325* (2013.01); *F04D 29/362* (2013.01); *B64D 2027/005* (2013.01); *F05D 2220/324* (2013.01); *F05D 2220/325* (2013.01); *Y02T 50/66* (2013.01); *Y02T 50/671* (2013.01); *Y02T 50/673* (2013.01)

(58) Field of Classification Search
CPC .. F05D 2220/325; Y02T 50/66; F04D 29/181; F04D 29/185; F04D 29/32; F04D 29/321; F04D 29/322; F04D 29/323; F04D 29/325; F04D 29/34; F04D 29/36; F04D 29/362
See application file for complete search history.

(56) References Cited

U.S. PATENT DOCUMENTS

| | | | |
|---|---|---|---|
| 9,085,979 B2* | 7/2015 | Balk | B64C 11/306 |
| 2010/0310369 A1 | 12/2010 | Perkinson | |
| 2012/0070292 A1 | 3/2012 | Balk et al. | |
| 2014/0017086 A1* | 1/2014 | Charier | B64C 11/308 |
| | | | 416/128 |

FOREIGN PATENT DOCUMENTS

| | | |
|---|---|---|
| GB | 644 100 | 10/1950 |
| WO | 2010 136685 | 12/2010 |

\* cited by examiner

SYSTEM FOR CHANGING THE PITCH OF THE CONTRA-ROTATING PROPELLERS OF A TURBOSHAFT ENGINE

BACKGROUND OF THE INVENTION

Field of the Invention

The present invention relates to a system for changing the pitch of the contra-rotating propellers of an aircraft turbo-engine termed an "open rotor" or an "unducted fan", and to the turbo-engine equipped with such a system.

Description of the Related Art

A turbo-engine of the above type comprises principally, inside a cylindrical nacelle borne by the structure of the aircraft (such as the rear portion of the fuselage of an airplane), a "gas generator" portion and, aligned behind the latter, a "propulsion" portion. This latter comprises two coaxial and contra-rotating propellers, respectively upstream (forward) and downstream (rear) which are driven in rotation, in opposite directions from one another, by respective rotor elements of a low pressure turbine of the gas generator portion, and wherein the blades of the propellers extend substantially radially outside the nacelle.

Each propeller comprises, in conventional fashion, a hub having a polygonal collar received in the nacelle and having radial cylindrical housings distributed on the periphery thereof about the longitudinal axis of the turbo-engine. The roots of the blades are received in the housings of each collar.

In order to allow the turbo-engine to function optimally in all the various phases of flight encountered, the blades of the contra-rotating propellers can rotate in the radial housings of the collars. To that end, the blades are driven in rotation about their respective pivot axes by an appropriate system making it possible to adjust the blade settings, that is to say the pitch of the propellers, in flight.

This system for changing the pitch of the blades of the propellers covers a range of rotation angles between one end position known as the "reverse" position, in which the blades are angled for example 20° past the plane transverse to the axis of the turbo-engine (the direction of motion of the airplane) in order to contribute to braking the aircraft in the manner of conventional thrust reversers, and another end position known as the "feathered" position in which the blades present the smallest possible cross section in the direction of motion of the airplane, for example in the event of a motor breakdown, so as to thus offer as little resistance (drag) as possible. The angular range of the blades between the feathered and reverse positions is of the order of 110°.

Various solutions have been proposed for changing the pitch of the blades of the propellers on "open rotor" turbo-engines, all of which are of highly complex construction and do not meet the required reliability objectives.

For example, one known system comprises a fluidic control via the intermediary of an annular actuator, the sliding elements of which act on the respective blades in order to drive the latter in rotation and vary the pitch thereof. Such a solution involves large diameter sliding elements and sealing problems (leaks) arise due to the deformations of the elements, even more so because there are as many sliding elements as there are blades. Moreover, the need for inertia in order to avoid ovalizations due to the rotation of the propellers leads to high overall mass.

Another known system comprises a fluidic control via a plurality of rotating actuators respectively associated with the blades of the propellers. This also suffers from sealing problems around the vanes of the rotary actuators, bulkiness problems as a result of the inherent size of the actuators which gives rise to an increase in the diameter of the nacelle in order to house them, and mass problems because of the number of actuators required.

Also known, from document WO2010/136685, is a system for controlling the orientation of the blades of contra-rotating propellers. This system, however, comprises blade synchronization collars associated with the rotating collars bearing the blades.

BRIEF SUMMARY OF THE INVENTION

The present invention aims to present a solution to these drawbacks and relates to a system for changing the pitch of the contra-rotating propellers of an aircraft turbo-engine, the design of which ensures operational reliability and limits the problems linked, in particular, to sealing and bulkiness.

To that end, the system for changing the pitch of the first and second coaxial and contra-rotating propellers of a turbo-engine having an unducted fan for aircraft, of the type controlled by fluidic or analogous means via a linear actuator aligned axially in the first propeller, being secured in rotation with the latter and comprising:
- a first connecting mechanism connecting the rod of said linear actuator to the second propeller in order to change the orientation of the blades thereof and comprising an intermediate connecting bearing between the propellers which is configured so as to transmit the movement in translation of the rod of the actuator and breaks the connection in rotation with the first propeller such that the orientation of the blades of the second propeller, driven in rotation in the opposite direction to the first, can be changed and
- a second connecting mechanism associated with the blades of the first propeller in order to change the orientation of these blades, is noteworthy in that the first connecting mechanism comprises:
- between the linear actuator connected to the first propeller and the intermediate bearing, a first connecting means articulated to the rod of the actuator and to one of the races of said bearing, and
- between the intermediate bearing and the blades of the second propeller, a second connecting means articulated to the other race of said bearing and to rotating radial shafts which are respectively secured in rotation with the roots of the blades of the second propeller so as to drive the shafts and the associated blades in rotation as a consequence of the movement in translation of the first mechanism via the rod of the actuator.

Thus, by virtue of the invention, by arranging an actuator—advantageously a linear actuator in the axis of one of the contra-rotating propellers—and appropriate mechanisms, of which the mechanism having a bearing makes it possible to control the orientation of the blades of the other propeller, the design of the system offers simplified production with one actuator and entirely mechanical connecting mechanisms having high operational reliability (the risk of leaks being almost zero) and limited weight, while being free from the drawbacks of the earlier solutions using controls having multiple actuators respectively associated with the blades of the propellers, these actuators being bulky and increasing sealing problems and other problems, or having annular actuators which are large and heavy, associated with said propellers, or via synchronization collars.

The intermediate bearing of the first connecting mechanism is preferably a ball bearing which is coaxial with the propellers, the inner race of which is secured in rotation with a cylindrical wall of the first propeller and is free to move in translation along this wall, and the outer race of which is secured in rotation with a cylindrical wall of the second propeller and is free to move in translation along this wall. The simplicity of construction of the bearing, ensuring optimum operational reliability with the outer race having a synchronizing function by engaging with the radial shafts of the blades via the second connecting means, is noted.

In particular, connections having splines or similar which are parallel to the axis of the propellers are provided between the respective races of the bearing and the corresponding cylindrical walls of the first and second propellers. This guides the races in translation with respect to the respective walls and prevents them from rotating with respect to each other.

According to another feature of the system, the linear actuator comprises two piston rods arranged telescopically one inside the other, wherein one of the rods is connected to the first connecting mechanism which controls the orientation of the blades of the second propeller, and the other rod is connected to the second connecting mechanism which controls the orientation of the blades of the first propeller. Thus, one and the same actuator housed in one of the propellers controls, by said mechanisms, the blades of both propellers, which helps to improve the reliability of the system and to reduce the bulkiness and mass thereof.

For example, the linear control actuator arranged along the axis of the propellers can be located between the first and second propellers, optimizing the compactness of the system, or behind both coaxial propellers, close to or partially inside the nozzle cone of the turbo-engine.

Preferably, the first and second propellers are the downstream and upstream propellers, respectively, of the turbo-engine.

In one embodiment, the first connecting means is a collection of connecting rods articulated to the rod of the actuator and to an internal annular interface between the cylindrical wall of the first propeller and the inner race of the bearing, and the second connecting means is a collection of connecting rods articulated to an external annular interface between the cylindrical wall of the second propeller and the outer race of the bearing, and respectively to crank pins secured to the rotating radial shafts. As a variant, the second connecting means is a collar having peripheral slide rails, rollers issuing from crank pins connected to said shafts engaging in these slide rails.

With regard to the second connecting mechanism, this can comprise a collection of connecting rods articulated to the corresponding rod of the linear actuator and to crank pins of rotating radial shafts which are respectively secured in rotation with the roots of the blades of the first propeller so as to drive the radial shafts and the associated blades in rotation as a consequence of the movement in translation of the second mechanism.

The invention also relates to a turbo-engine having an unducted fan, comprising two coaxial and contra-rotating propellers. Advantageously, it comprises the system for changing the pitch of the blades of the propellers as defined hereinabove.

BRIEF DESCRIPTION OF THE SEVERAL VIEWS OF THE DRAWINGS

How the invention can be produced will be easily understood with reference to the figures of the appended drawing.

DETAILED DESCRIPTION OF THE INVENTION

Figure 1:
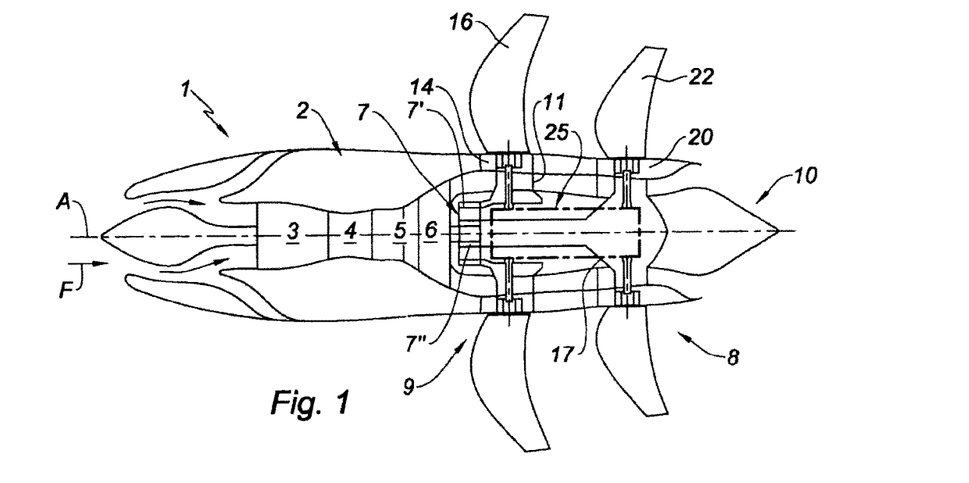
FIG. 1 is a schematic view, in axial section, of a turbo-engine having an unducted fan, incorporating the system for changing the pitch of the propellers of the fan.

Reference is made first of all to FIG. 1 which shows, schematically, a turbo-engine having an unducted fan 1, also termed an "open rotor". This turbo-engine comprises, as is conventional, from upstream to downstream as seen in the direction of the flow of gases F inside a nacelle 2 of the turbo-engine, a compressor 3, an annular combustor 4, a high pressure turbine 5 and a free low pressure turbine 6 which drives, via the intermediary of a reduction gear or epicyclic gearset 7 and in a contra-rotating fashion, two propellers 8, 9 which are aligned coaxially along the longitudinal axis A of the turbo-engine and which make up the fan.

The propellers, specifically a first downstream propeller 8 and a second upstream propeller 9, are arranged in parallel radial planes which are perpendicular to the axis A, and rotate in opposite directions by virtue of the low pressure turbine 6 and the epicyclic reduction gear 7.

Figure 2:
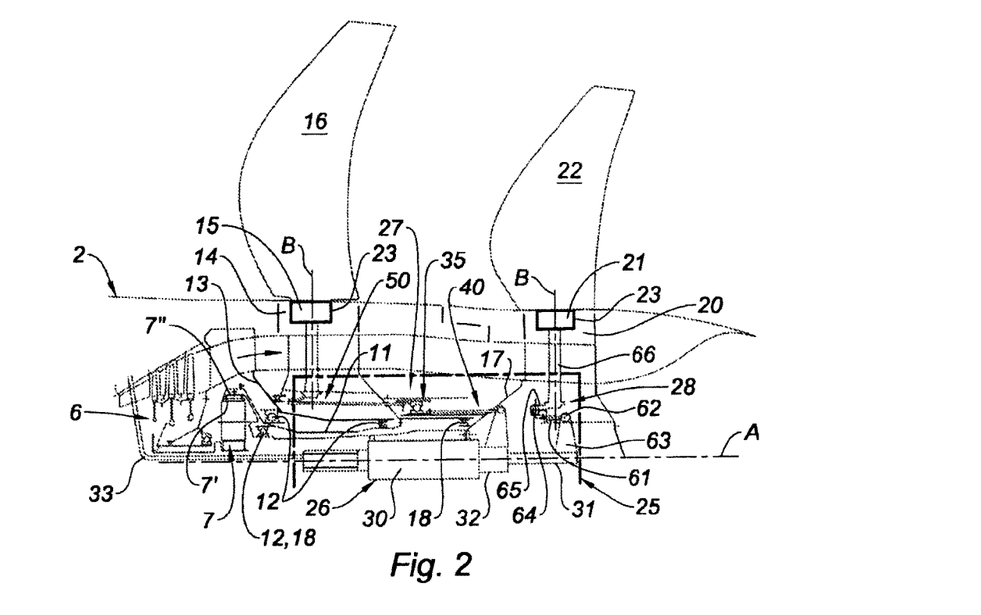
FIG. 2 is an axial half section of the rear of the turbo-engine with said system for changing the pitch of the propellers in accordance with the invention, according to a preferred embodiment.

To that end, as shown in FIGS. 1 and 2, the upstream propeller 9 comprises a cylindrical casing forming a rotor 11, connected in rotation to a corresponding portion 7' of the reduction gear rotating in one direction and supported by rolling bearings 12 on a static cylindrical casing 13 of the turbo-engine. The casing forming a rotor 11 terminates, on the other side from the reduction gear 7, in a polygonal collar 14 which is housed in the nacelle 2 and which receives the roots 15 of the blades 16 of the propeller 9 which thus project out from the nacelle.

In a similar fashion, the downstream propeller 8 comprises a cylindrical casing forming a rotor 17 which is connected in rotation on one side to another portion 7" of the reduction gear 7, rotating in an opposite direction and supported, here as well, by rolling bearings 18 on the static cylindrical casing 13. On the other side, the casing forming a rotor 17 terminates in a polygonal collar 20 which receives, in a similar fashion to that mentioned previously, the roots 21 of the blades 22 of the propeller 8.

In operation, and briefly, the air flow F entering the turbo-engine 1 is compressed, then mixed with fuel and burned in the combustor 4. The combustion gases produced then pass into the turbines 5 and 6 in order to drive the propellers 8, 9 which provide the majority of the thrust in rotation in opposite directions via the epicyclic reduction gear 7.

The combustion gases are ejected through a nozzle 10 in order to increase, in this manner, the thrust of the turbo-engine.

Furthermore, the blades 16, 22 of the upstream and downstream propellers are of the variable setting type, that is to say that their orientation about their radial pivot axes B can be varied so as to give them an optimum angular position according to the operating conditions of the turbo-engine and the phases of flight in question. To that end, the roots of the blades are mounted in receiving housings 23 of each polygonal collar, and a system 25 for changing the pitch of the blades (and thus their setting), which system forms the subject matter of the invention, is provided in order to vary the angular position of the blades and thus the pitch of the propellers.

Beforehand, for obvious structural and functional reasons, and as shown in FIGS. 1 and 2, the cylindrical casing forming a rotor 17 for driving the downstream propeller 8 is surrounded by the cylindrical casing forming a rotor 11 for driving the upstream propeller 9. An inverse solution would of course not be very realistic.

Figure 3:
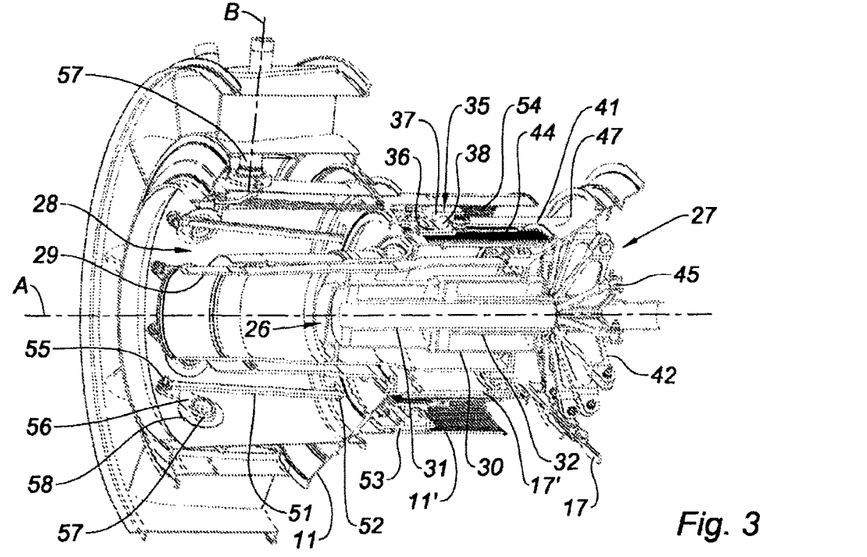
FIG. 3 shows, in a perspective view, a cutaway of part of the changing system in one of its two operating end positions.

As shown in FIGS. 2 and 3, this changing system 25 comprises a power control in the form of a linear actuator 26 arranged along the longitudinal axis A inside a rotating shaft 29 around which is connected the casing forming a rotor 17 of the downstream propeller, a first connecting mechanism 27 connecting the actuator to the blades of the second upstream propeller 9, and a second connecting mechanism 28 associated with the blades of the first downstream propeller 8.

In the embodiment shown, the linear actuator 26 of the changing system 25 is of the telescopic type and comprises a cylinder 30 which is fixed in translation and secured in rotation with the shaft 29 in order to rotate about the axis A, and two piston rods—an internal rod 31 and an external rod 32. In particular, the internal piston rod 31 is connected to the roots 21 of the blades 22 of the downstream propeller 8 by the second connecting mechanism 28, and the external piston rod 32, surrounding the internal rod, is connected to the roots 15 of the blades 16 of the upstream propeller 9 by the first mechanism 27.

Thus, one and the same linear actuator 26 contributes to the operation of the blades of the propellers. In addition, a fluidic power source which is not shown, to which the actuator 26 is connected via a duct 33, supplies the chambers of the cylinder 30 in conventional fashion, preferably hydraulically, for the operation of the internal and external piston rods which can be carried out simultaneously or independently so as to drive, via the connecting mechanisms 27 and 28, the concomitant changing of the pitch of the blades of the two propellers according to an identical or different angular variation, or to drive only the changing of the pitch of one of the two propellers, the blades of the other propeller keeping the same setting by choice or for any other reason (such as damage or a breakdown).

The first connecting mechanism 27 will be described below.

It is recalled that this mechanism must make it possible, by virtue of its connection with the linear actuator 26 connected in rotation with the downstream propeller 8, to vary the orientation of the blades of the upstream propeller 9. In order to "pass" a movement of this type, the mechanism 27 comprises in particular an intermediate bearing 35 which makes it possible to decouple the rotation in one direction of the downstream propeller in order to allow the upstream propeller, driven by the portion in question of the reduction gear 7, to rotate freely in the opposite direction.

Figure 4:
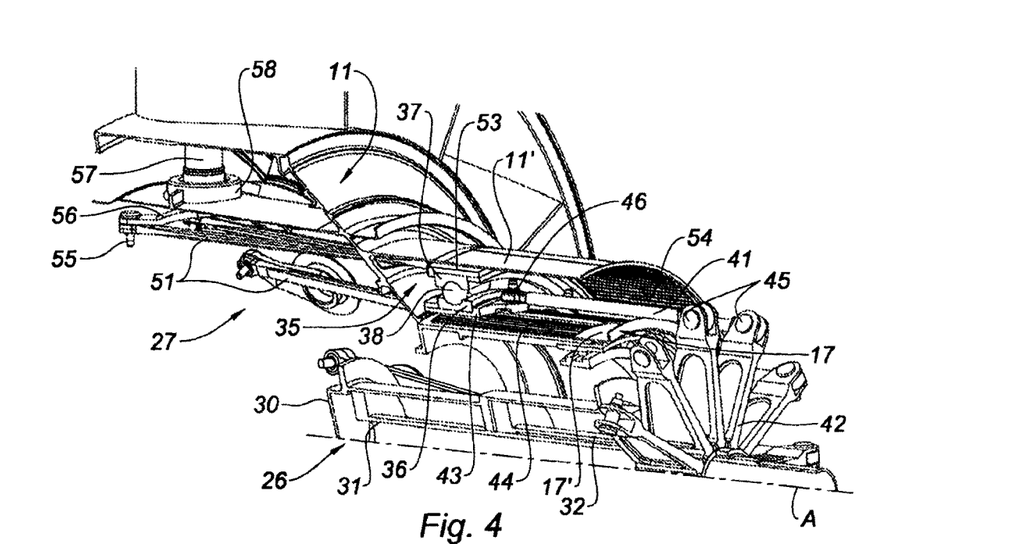
FIG. 4 shows in detail, in another perspective view, an enlarged cutaway of part of the first connecting mechanism, having an intermediate bearing, of said system.

More particularly, as shown in FIGS. 2, 3 and 4, the intermediate bearing 35 is a ball bearing which is coaxial with the longitudinal axis A and is arranged between the two casings 11, 17. That is to say it is arranged outside the rotating casing 17 of the downstream propeller 8, driven in rotation by the portion 7" of the epicyclic reduction gear 7, and outside the rotating casing 11 of the upstream propeller 9 which is driven in reverse rotation by the portion 7' of the reduction gear.

The inner race 36 of the rolling bearing 35 is connected to the external rod 32 of the linear actuator 26 by a first connecting means 40 such as a collection of peripheral connecting rods 41 which pass through openings 47 created in the rotating casing 17 of the downstream propeller in order to "leave" that casing. The connecting rods 41 are articulated, on one side, to a collar having radial fittings 42 surrounding the external piston rod and, on the other side, to an inner collar 43 bearing externally the inner race 36 while securing it in translation, and engaging internally with a cylindrical wall 17' of said rotating casing 17 via a connection having splines 44 or similar parallel to the axis A. The connecting rods 41 are respectively connected to the collar having fittings 42 and to the inner collar 43 by means of pins 45, 46. The movement in translation of the actuator 26 is transmitted to the inner race 36 of the bearing by means of the connecting rods 41 and the connection having splines 44 between the collar 43 and the cylindrical wall of the rotating casing 17 of the propeller.

The outer race 37 of the rolling bearing 35 is connected to the roots 15 of the blades 16 of the upstream propeller 9 by a second connecting means 50 comprising a collection of connecting rods 51 which pass through openings 52 created in the rotating casing 11 of the upstream propeller in order to "enter" that casing. On one side, the connecting rods 51 are associated with an outer collar 53 bearing the outer race 37 of the rolling bearing. The outer collar 53 engages, in the same way as the inner collar 43, via a connection having splines 54, with a cylindrical wall 11' of the rotating casing 11 of the upstream propeller. The two races 36, 37 are "stopped" in rotation or decoupled by the connections having splines 44, 54 which, moreover, guide the movement in translation imparted by the external rod 32 of the actuator 26.

On the other side, the connecting rods 51, of which there are as many as there are blades 16, are articulated, via pins 55, to crank pins 56 provided perpendicular to one end of rotating radial shafts 57 which are orthogonal to the axis A and are coupled at their other end to the roots 15 of the respective blades 16. The shafts 57 are moreover held in position by bearing surfaces 58 provided around the periphery of the rotating casing 17 of the upstream propeller.

The first connecting mechanism 27 in its entirety is shown in particular in FIG. 4, and the operation thereof will be described below.

Figure 8:
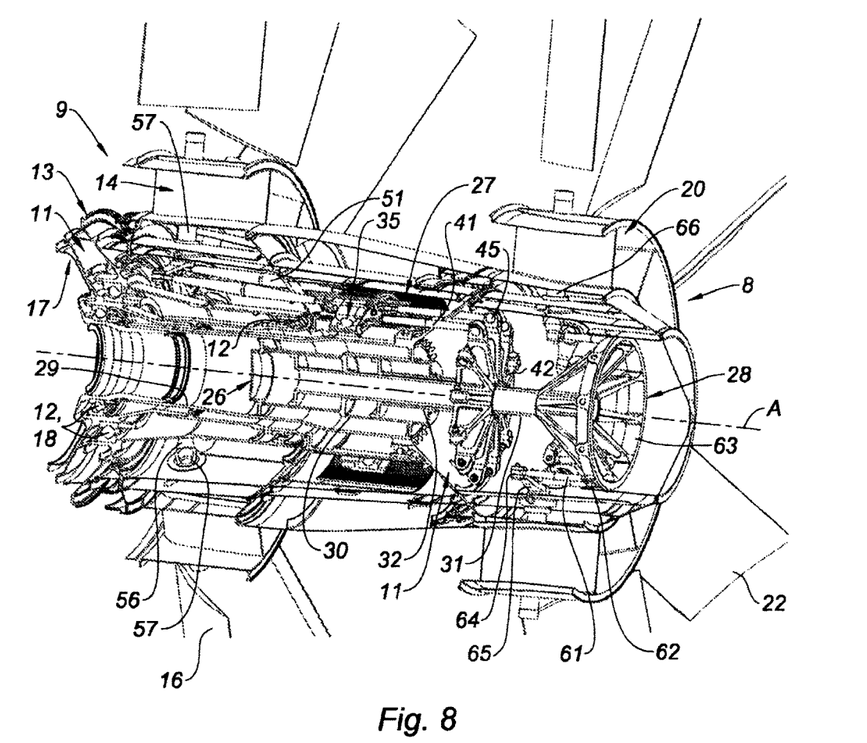
FIG. 8 shows, in perspective, a cutaway of the system of the invention with its two mechanisms for connecting to the propellers in an intermediate blade position.

Beforehand, the second connecting mechanism 28 which links, in this embodiment, the internal piston rod 31 of the actuator to the roots 21 of the blades 22 of the downstream propeller 8 comprises, here as well, as shown schematically in FIG. 2 and in more detail in FIG. 8, a collection of peripheral connecting rods 61 which are arranged in the rotating casing 17 about the axis A and of which there are as many as there are blades 22 fitted to the downstream propeller 8. For this, the connecting rods 61 are articulated, on one side, about pins 62, to radial fittings of a collar 63 provided around the end of the internal rod of the actuator and, on the other side, about pins 64, to crank pins 65 which terminate perpendicular to one end of rotating radial shafts 66, the other end of which is secured in rotation with the root 21 of the corresponding blade 22. The radial shafts 66 are similar to the shafts 57.

Figure 6:
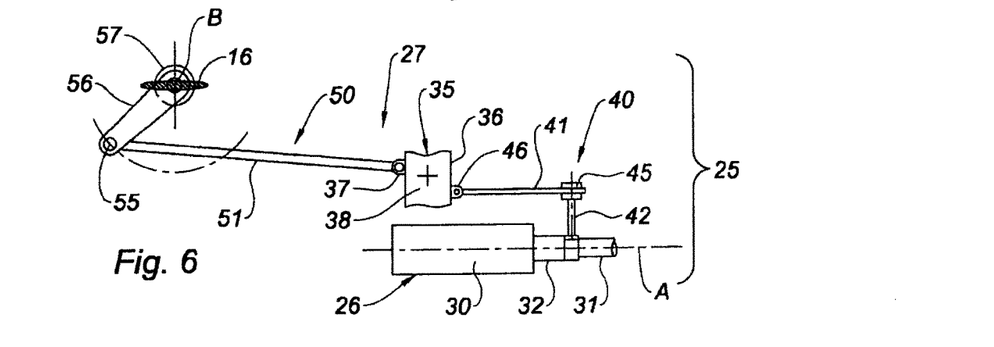
FIGS. 6 and 7 are schematic views showing the motion of the operation of the system between the two end positions for one of the blades of the upstream propeller.
Figure 7:
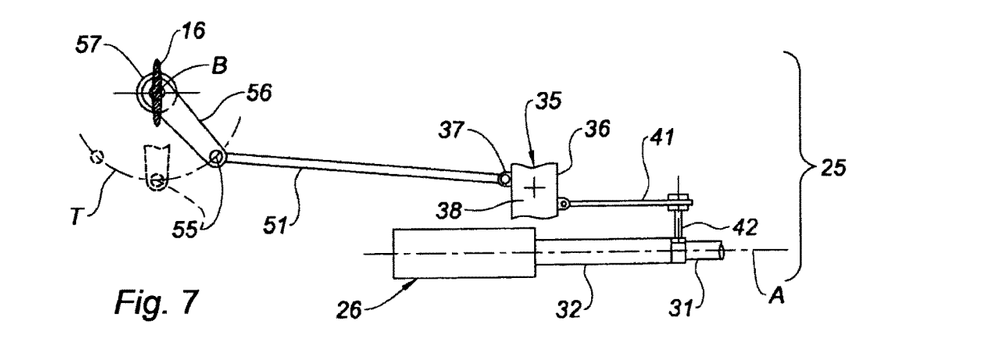

FIGS. 6 and 7 illustrate schematically the motion of the operation of the system 25 between the two end positions which the blades of the propellers may adopt. Of course, any other intermediate position between these end positions may be adopted by the blades of the contra-rotating propellers 8, 9, as shown in FIG. 8.

It is assumed that, when the system 25 is in the position shown in FIGS. 2, 3, 4 and 6, in which the external and internal rods of the telescopic control actuator 26 are in the retracted position, the blades 15, 21 of the propellers are in the feathered position, that is to say in line with the turbo-engine so as to present as little resistance (drag) as possible. This feathered position of the blades of the propellers is, for example, used in the event of an engine breakdown.

FIG. 6 thus shows the schematized cross section of a blade 16 in the feathered position with the pin 55 for articulating the crank pin 56 to the corresponding connecting rod 51 away from the actuator. The propellers rotate in the opposite direction from one another by means of the rotating casings in question, the latter being driven by the epicyclic reduction gear 7 which is, in turn, driven by the low pressure turbine 5. The ball bearing 35 acts as a "free wheel" allowing the two propellers to rotate freely in opposite directions despite being connected by the system for changing the pitch 25.

When the orientation of the blades of the upstream propeller 9 is to be changed, the changing system 25 acts and, to that end, the control actuator 26, which is driven in rotation about the axis A by the rotating casing 17 of the downstream propeller, is actuated fluidically so as to move the external rod 32 in translation into the fully extended position in this example.

Thus, the fittings 42 pull the connecting rods 41 of the first connecting means 40 toward the rear of the turbo-engine 1, dragging with them the inner race 36 of the rolling bearing 35 by means of the inner collar 43 which slides against the cylindrical wall of the casing 17 by means of the splines 44. Of course, the outer race 37 of the rolling bearing simultaneously follows the movement of the inner race due to the large diameter balls 38 housed in deep grooves of the races in order thus to transmit even large forces without difficulty. The rod 32 thus moves the bearing 35 in translation along the splines 44 and 54 while making it possible not to connect in rotation the casings 11, 17 of the propellers driven in rotation in opposite directions.

The outer race 37 of the rolling bearing pulls, by means of the outer collar 53, the connecting rods 51 of the second connecting means 50, which connecting rods 51 in turn drive in rotation, via the intermediary of the crank pins 56 which act as the lever arms as in a connecting rod-crank connection, the radial shafts 57 and thus the roots 15 of the blades which rotate in the housings 23 of the polygonal collar 14.

The articulating pin 55 which links the connecting rod to the crank pin and which is shown in FIGS. 6 and 7 thus follows the circular trajectory T centered on the axis B of the radial shaft 57, which is also the pivot axis of the blade 16, with a force which increases and peaks when the connecting rod is perpendicular to the crank pin, the lever arm of which is large, thus making it possible to transmit forces (moments) while reducing the forces in the connecting rods and the actuator, and making it possible to change the pitch of the blades without difficulty.

Figure 5:
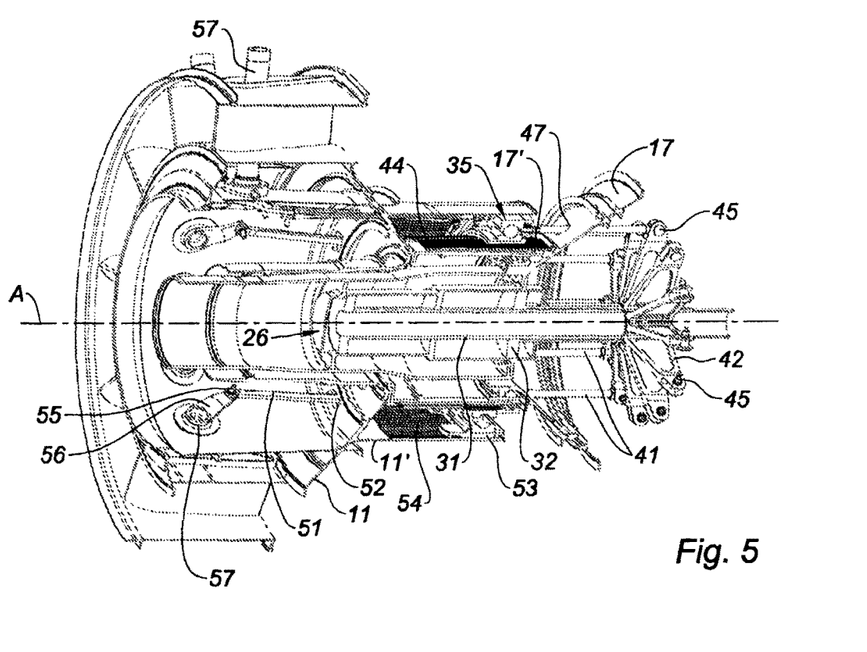
FIG. 5 is a view similar to FIG. 3, showing the changing system in the other operating end position.

The other end position of the blades of the upstream propeller, obtained using the system 25 of the invention and, in particular, using the actuator 26 and the first connecting mechanism 27 having a bearing 35, is shown in FIGS. 5 and 7. This end position, schematized in FIG. 7, is termed the reverse position, wherein the blades are turned substantially 110° with respect to the feathered position in order to oppose in this way the motion of the airplane (maximum drag) and to contribute to braking the latter.

The external rod 32 of the linear actuator 26 then assumes the fully extended position, having driven the movement of the ball bearing 35 via the collars bearing the races along the wall 17' of the rotating cylindrical casing 17 of the downstream propeller and along the wall 11' of the rotating cylindrical casing 11 of the upstream propeller by means of the splines 44, 54. The connecting rods 51, drawn by the rolling bearing, drive the angular rotation, about the axes B, of the crank pins 56, of the rotating radial arms 57 and, as a consequence, the simultaneous rotation of the roots 15 of the blades 16 of the upstream propeller 9.

FIG. 5 shows that the internal piston rod 31 remains in its retracted position. The internal piston rod can of course be moved simultaneously with the external piston rod 32, such that the pitch of the blades 16, 22 of the upstream propeller 9 and downstream propeller 8 changes simultaneously via the intermediary, respectively, of the first mechanism 27 and the second mechanism 28. The operation of the latter is not described in any more detail as it is similar to and simpler than that of the first mechanism 27, due to there being no intermediate bearing. However, it is clearly depicted in FIG. 8, which shows the turbo-engine 1 with the blades of the propellers in an intermediate position which corresponds to the airplane taking off.

The piston rods 31 and 32 have thus both been moved by an appropriate amount relative to the cylinder 30 of the actuator 26 via the supply (duct 33), which actuator rotates via the shaft 29 and the rotor casing 17. The operation of the mechanism 27 of the system 25, which has driven the orientation of the blades 16 of the propeller 9, will not be considered again subsequently. With regard to the mechanism 28, it can be seen that, as a consequence of the rearward movement in translation of the internal rod 31, the connecting rods 61 which are connected to the collar having fittings 63 at the end of this rod 31 are pulled and actuate the rotating radial shafts 66 of the blades 22 of the propeller 8 directly, making these shafts rotate via the crank pins 65 and the pins 62, 64.

Advantageously, it is noted that the collars having fittings 42 and 63 of the respective connecting mechanisms 27, 28 (with the bearing 35 for the mechanism 27) act as conventional synchronizing collars (in place of the latter) in order to act on the radial shafts of the blades and thus on the orientation of these blades and to avoid any variation in setting from one blade to the other.

During the various phases of flight and encountered conditions, the blades can be oriented, using the system 25 of the invention, simultaneously or independently between the two end positions.

Figure 9:
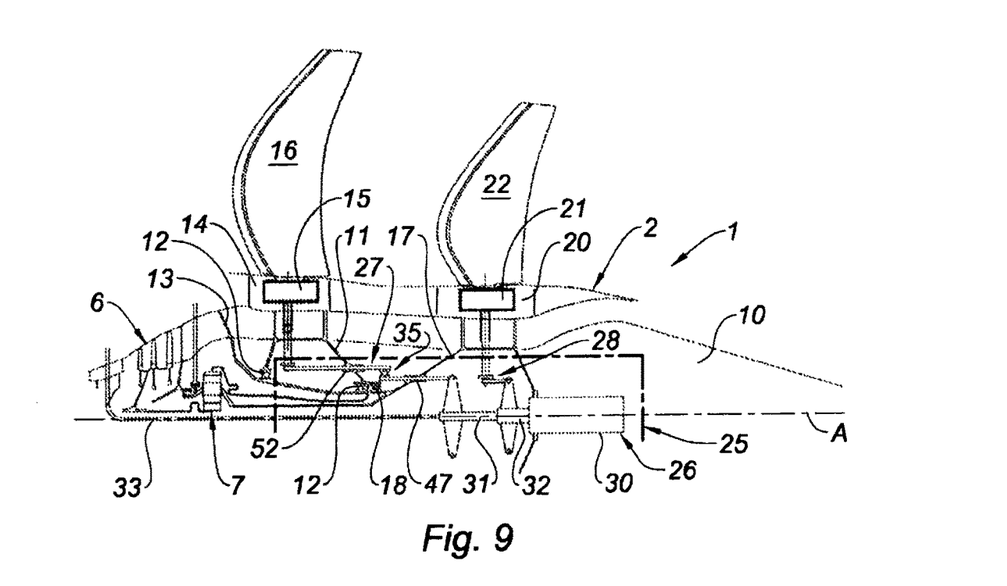
FIG. 9 is an axial half section of the rear of the turbo-engine, similar to FIG. 2, showing a variant arrangement of the actuator for controlling the connecting mechanisms.

Whereas in the preceding embodiment the linear control actuator 26 of the system 25 is located between the upstream propeller 9 and the downstream propeller 8, in another embodiment shown schematically with regard to FIG. 9, the linear actuator 26 is located behind the downstream propeller 8, substantially level with the nozzle cone 10 of the turbo-engine 1.

The linear actuator 26 is still arranged in the axis A of the turbo-engine, with its cylinder 30 connected in rotation with the rotating casing 17 of the downstream propeller 8. By contrast, the telescopic rods face the front of the turbo-engine, such that the external rod 32 of the actuator is then connected to the blades 22 of the downstream propeller by the second connecting mechanism 28, and the internal rod 31 of the actuator is, on the other hand, connected to the blades 16 of the upstream propeller via the first connecting mechanism 27. The first and second connecting mechanisms are structurally and functionally identical to those in the preceding embodiment.

Figure 10:
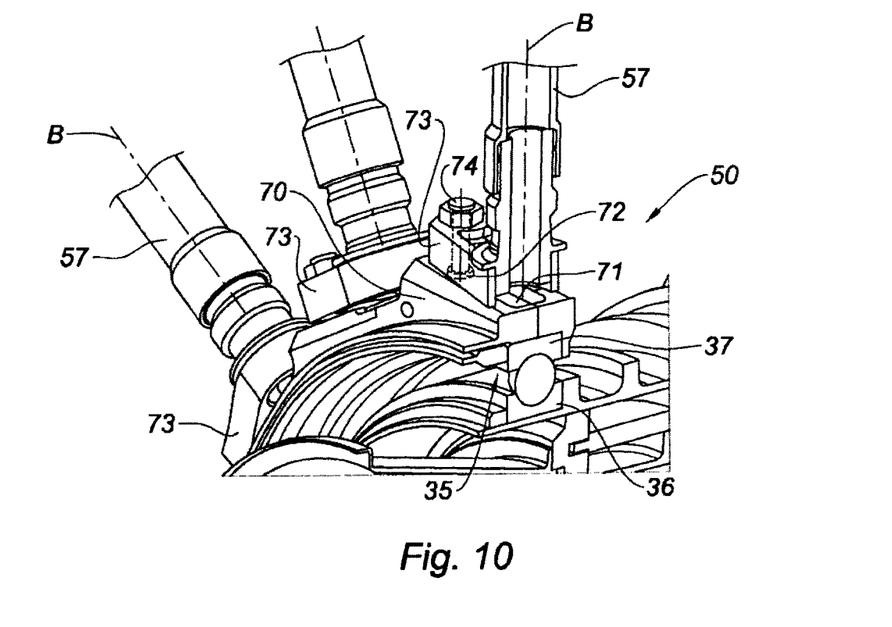
FIG. 10 shows, in perspective, a cutaway of part of an embodiment variant of the first connecting mechanism.

One embodiment variant of the second connecting means 50 of the first mechanism 27 is shown with regard to FIG. 10. In this variant, the outer race 37 of the ball bearing 35 is surrounded by a collar or crown 70 which is secured to the race 37 and has, peripherally, slide rails 71. Rollers 72 engage in these slide rails, wherein these rollers issue forth, via the intermediary of pins 74, from the crank pins 73 connected perpendicular to the radial shafts 57 at the end of which are attached, along the axes B, the roots of the blades (not shown) of the propeller 9.

It is thus understood that, when the rolling bearing is pulled or pushed by the rod of the actuator 26 and the first connecting means 40 in the direction of the axis A, the rollers follow the slide rails 71 of the collar 70, which is secured in displacement with the race 37, and drive in rotation, via the crank pins 73 forming cranks with an appropriate lever arm, the radial shafts 57 and, as a consequence, the blades according to the chosen pitch.

The invention claimed is:

1. A system for changing pitch of a first propeller and of a second propeller of a turbo-engine including an unducted fan for aircraft, the first and second propellers being coaxial and contra-rotating propellers, the system being controlled by a linear actuator which is arranged along an axis of the first and second propellers and which is connected in rotation with the first propeller, the system comprising:
    a first connecting mechanism establishing a connection between a rod of the linear actuator and the second propeller to change orientation of blades of the second propeller, said first connecting mechanism comprising an intermediate connecting bearing between the first and second propellers which has an inner race and an outer race and which is configured to transmit movement in translation of the rod of the linear actuator and break the connection in rotation of the rod of the linear actuator to the second propeller such that the orientation of the blades of the second propeller can be changed; and
    a second connecting mechanism associated with blades of the first propeller to change orientation of the blades of the first propeller;
    wherein the first connecting mechanism comprises:
        between the linear actuator and the intermediate connecting bearing, a first connecting means comprising at least a first connecting rod articulated to the rod of the linear actuator and to one of the inner and outer races of the intermediate connecting bearing, and
        between the intermediate connecting bearing and the blades of the second propeller, a second connecting means comprising at least one second connecting rod articulated to the other of the inner and outer races of the intermediate connecting bearing and to first rotating radial shafts respectively secured in rotation with roots of the blades of the second propeller to drive in rotation the first rotating radial shafts and the blades associated with the first rotating radial shafts as a consequence of movement in translation of the first connecting mechanism via the rod of the linear actuator.

2. The system as claimed in claim 1, wherein the intermediate connecting bearing of the first connecting mechanism is a ball bearing which is coaxial with the first and second propellers, the inner race of the intermediate connecting bearing being secured in rotation with a first cylindrical wall of the first propeller and is free to move in translation along the first cylindrical wall of the first propeller, and the outer race of the intermediate connecting bearing being secured in rotation with a second cylindrical wall of the second propeller and is free to move in translation along the second cylindrical wall of the second propeller.

3. The system as claimed in claim 2, wherein connections having splines which are parallel to the axis of the first and second propellers are provided between the respective races of the intermediate connecting bearing and the first and second cylindrical walls of the first and second propellers, respectively.

4. The system as claimed in claim 1, wherein the rod of the linear actuator comprises first and second rods arranged telescopically one inside the other, wherein the first rod is connected to the first connecting mechanism which controls the orientation of the blades of the second propeller, and the second rod is connected to the second connecting mechanism which controls the orientation of the blades of the first propeller.

5. The system as claimed in claim 4, wherein the linear actuator arranged along the axis of the first and second propellers is located between the first and second propellers or behind both the first and second propellers.

6. The system as claimed in claim 4, wherein the first connecting means comprises a collection of first connecting rods articulated to the first rod of the linear actuator and to an internal annular interface between the first cylindrical wall of the first propeller and the inner race of the intermediate connecting bearing, and
    wherein the second connecting means comprises a collection of second connecting rods articulated to an external interface between the second cylindrical wall of the second propeller and the outer race of the intermediate connecting bearing, and respectively to crank pins secured to the first rotating radial shafts.

7. The system as claimed in claim 4, wherein the second connecting mechanism comprises a collection of second connecting rods articulated to the second rod of the linear actuator and crank pins of second rotating radial shafts which are respectively secured in rotation with roots of the blades of the first propeller, the second connecting rods being articulated to the crank pins, in order to drive in rotation the second rotating radial shafts and the blades of the first propeller as a consequence of movement in translation of the second rod of the linear actuator.

8. The system as claimed in claim 4, wherein the first and second rods of the linear actuator are piston rods.

9. The system as claimed in claim 1, wherein the first and second propellers are respectively downstream and upstream propellers of the turbo-engine.

10. The system as claimed in claim 1, wherein the second connecting means comprises a collar including peripheral slide rails and rollers issuing from crank pins connected to the first rotating radial shafts which engage in the slide rails.

11. A turbo-engine comprising an unducted fan, comprising first and second coaxial and contra-rotating propellers, and comprising the system for changing pitch of a first propeller and a second propeller of a turbo-engine as claimed in claim 1.

\* \* \* \* \*